US012592983B2

(12) United States Patent
Puttagunta et al.

(10) Patent No.: US 12,592,983 B2
(45) Date of Patent: Mar. 31, 2026

(54) LOCAL DEVICE IDENTIFIERS IN A STORAGE NETWORK

(71) Applicant: Hewlett Packard Enterprise Development LP, Spring, TX (US)

(72) Inventors: Krishna Babu Puttagunta, Rocklin, CA (US); Chandrashekar Chikkalingaiah Manchanapura, Bangalore Karnataka (IN); Kirill Malkin, Berkeley Heights, NJ (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/663,162

(22) Filed: May 14, 2024

(65) Prior Publication Data

US 2025/0274513 A1     Aug. 28, 2025

(30) Foreign Application Priority Data

Feb. 28, 2024     (IN) .............................. 202411014710

(51) Int. Cl.
*H04L 67/1097* (2022.01)
*H04L 45/00* (2022.01)
*H04L 67/141* (2022.01)

(52) U.S. Cl.
CPC ........ *H04L 67/1097* (2013.01); *H04L 45/566* (2013.01); *H04L 67/141* (2013.01)

(58) Field of Classification Search
CPC .. H04L 67/1097; H04L 67/141; H04L 45/566
(Continued)

(56) References Cited

U.S. PATENT DOCUMENTS 10,966,058 B1 *   3/2021   Pai ...................... H04W 68/005
11,159,612 B1    10/2021   Puttagunta et al.
(Continued)

FOREIGN PATENT DOCUMENTS

CN        104823428 B   *  5/2019   ......... H04L 67/1097
CN        110392876 A   * 10/2019   ........... G06F 3/0617
(Continued)

OTHER PUBLICATIONS

Brocade, "Secure SAN Zoning Best Practices," 2015, White Paper, <https://web.archive.org/web/20150430191124/http://www.brocade.com/downloads/documents/white_papers/Zoning_Best_Practices_WP-00.pdf>, 10 pages.
(Continued)

*Primary Examiner* — Ruolei Zong
(74) *Attorney, Agent, or Firm* — Hewlett Packard Enterprise Patent Department

(57)        ABSTRACT

Example implementations relate to storage networks. In some examples, a controller receives a packet sent from a source device to a destination device. The controller reads a local identifier of the source device at a first offset in the packet, where a global identifier of the source device is located at a second offset that is larger than the first offset. The controller also reads a local identifier of the destination device at a third offset in the packet, where a global identifier of the destination device is located at a fourth offset that is larger than the third offset. In response to a determination that the combination of the local identifiers of the source and destination devices matches a predefined zone rule, the controller causes a delivery of the packet to the destination device.

20 Claims, 10 Drawing Sheets

(58) Field of Classification Search
USPC .......................................................... 709/203
See application file for complete search history.

(56) References Cited

U.S. PATENT DOCUMENTS

| | | | |
|---|---|---|---|
| 11,487,690 B2 | 11/2022 | Puttagunta et al. | |
| 11,579,808 B2 | 2/2023 | Satapathy et al. | |
| 2006/0164213 A1* | 7/2006 | Burghard ............ | H04W 40/248 |
| | | | 340/10.2 |
| 2016/0285913 A1* | 9/2016 | Itskin .................... | H04L 45/021 |
| 2022/0294828 A1* | 9/2022 | Keiser, Jr. ........... | H04L 63/0245 |

FOREIGN PATENT DOCUMENTS

| | | | | | |
|---|---|---|---|---|---|
| CN | 111737540 A | * | 10/2020 | ....... | G06F 16/90335 |
| JP | 2005505038 A | * | 2/2005 | ............. | H04L 47/10 |
| JP | 2005505819 A | * | 2/2005 | ......... | H04L 67/1097 |
| WO | WO-2016087750 A1 | * | 6/2016 | ......... | H04L 63/0807 |

OTHER PUBLICATIONS

Flackbox, "Fibre Channel SAN Part 3 - Fabric Login," Accessed Oct. 4, 2023, <https://www.flackbox.com/fibre-channel-san-part-3-flogi-plri-login>, 15 pages.

Jeff Atwood, "URL Shortening: Hashes In Practice," Aug. 2007, Coding Horror, Blog, <https://blog.codinghorror.com/url-shortening-hashes-in-practice/>, 31 pages.

Jon Langemak, "FCIDs, WWNs, Zoning, and VSANs," Jan. 2011, Das Blinken Lichten, <https://www.dasblinkenlichten.com/fcids-wwns-zoning-and-vsans/>, 11 pages.

Kim et al., "SAN Overview: How Fibre Channel Hosts & Targets Really Communicate," Sep. 23, 2021, Storage Network Industry Association presentation, <https://www.snia.org/sites/default/files/ESF/How-Fibre-Channel-Hosts-Targets-Communicate-Final.pdf>, 34 pages.

Mazurek et al., "Fibre Channel Zoning Basics," Jun. 2019, Fibre Channel Industry Association, 43 pages.

Mokubai et al., "How can SHA512 make a long string into a short string," May 2014, Superuser, Blog, <https://superuser.com/questions/758815/how-can-sha512-make-a-long-string-into-a-short-string>, 5 pages.

Oneman et al., "What is the difference of Hard Zoning and soft Zoning?," 2023, Huawei Tech Forum, <https://forum.huawei.com/enterprise/intl/en/thread/using-the-oceanstor-systemreporter-reporting-tool-for-the-monitoring-of-oceanstor-9000-what-are-the-resource-objects-that-can-be-monitored/693644977407672320?blogld=693644977407672320>, 7 pages.

Sun Microsystems, Inc., "SAN Fundamentals: How Fibre Channel SANs Are Built, Secured and Managed," Apr. 2007, 26 pages.

Tseng, et al., "Internet Storage Name Service (iSNS)," Sep. 2005, <https://www.rfc-editor.org/rfc/rfc4171.html>, 123 pages.

* cited by examiner

START ——— 200

Receive a request to register a device into a storage network ——— 210

Determine global identifier (GID) of device ——— 220

Generate a local identifier (LID) of device based on the GID ——— 230

Register the device using the LID ——— 240

Send notification of the LID to devices in the storage network ——— 250

Generate zone rules using LIDs ——— 260

END

Global ID 310    | G1 | G2 | G3 | G4 | G5 | ... | G255 |

Convert

Local ID 320    | L1 | L2 | L3 | L4 |

Network Device
800

Hardware Processor(s)
802

Machine Readable Medium
805

810

Receive a packet sent from a source device to a destination device in a storage network, where the packet includes a local identifier of the source device, a global identifier of the source device, a local identifier of the destination device, and a global identifier of the destination device

820

Read the local identifier of the source device at a first offset in the packet, where the global identifier of the source device is located at a second offset that is larger than the first offset

830

Read the local identifier of the destination device at a third offset in the packet, where the global identifier of the destination device is located at a fourth offset that is larger than the third offset

840

In response to a determination that a combination of the local identifiers of the source and destination devices matches a predefined zone rule, cause a delivery of the packet to the destination device

FIG. 8

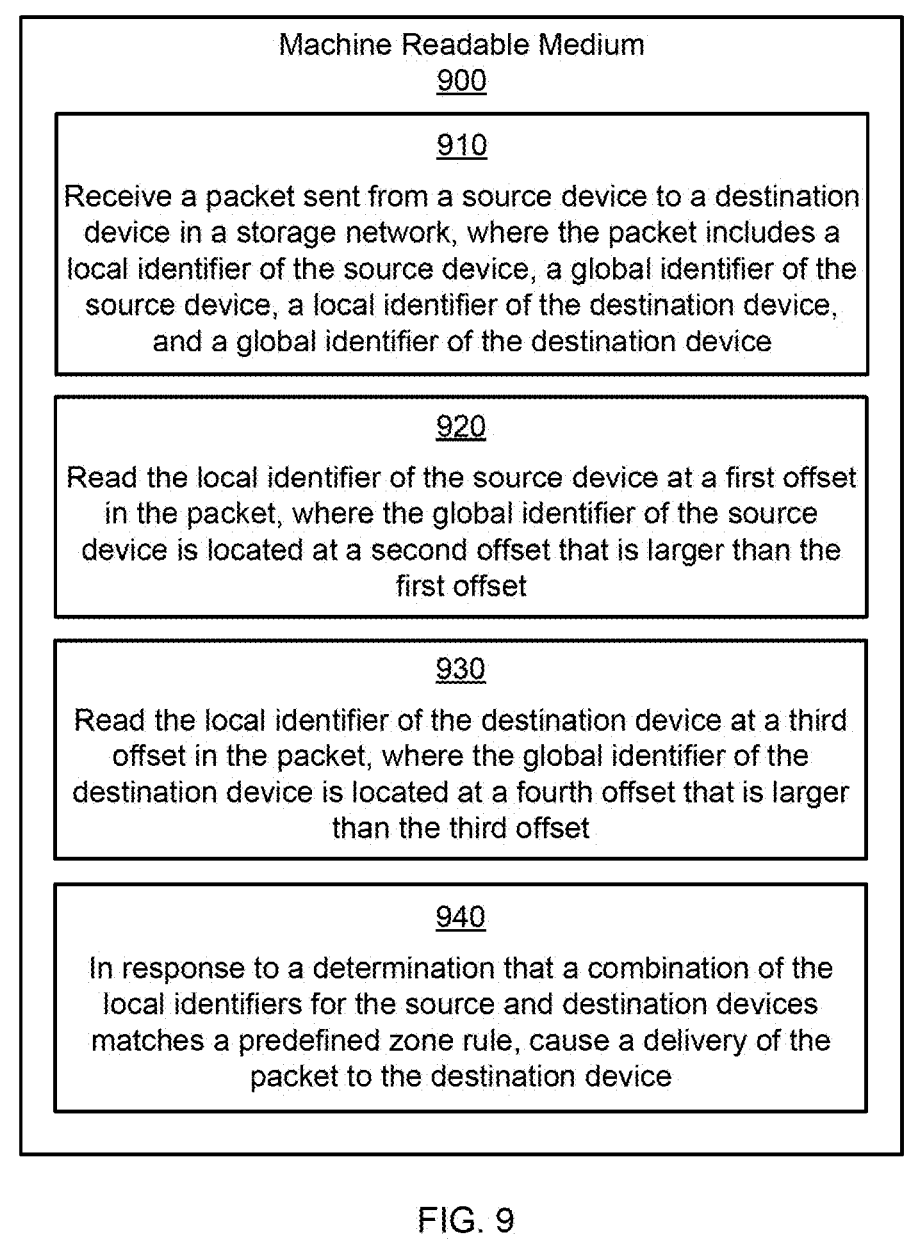

Machine Readable Medium
900

910

Receive a packet sent from a source device to a destination device in a storage network, where the packet includes a local identifier of the source device, a global identifier of the source device, a local identifier of the destination device, and a global identifier of the destination device

920

Read the local identifier of the source device at a first offset in the packet, where the global identifier of the source device is located at a second offset that is larger than the first offset

930

Read the local identifier of the destination device at a third offset in the packet, where the global identifier of the destination device is located at a fourth offset that is larger than the third offset

940

In response to a determination that a combination of the local identifiers for the source and destination devices matches a predefined zone rule, cause a delivery of the packet to the destination device

FIG. 9

LOCAL DEVICE IDENTIFIERS IN A STORAGE NETWORK

BRIEF DESCRIPTION OF THE DRAWINGS

Some implementations are described with respect to the following figures.

FIG. 8 is a schematic diagram of an example network device, in accordance with some implementations.

FIG. 9 is a diagram of an example machine-readable medium storing instructions in accordance with some implementations.

Figure 1A:
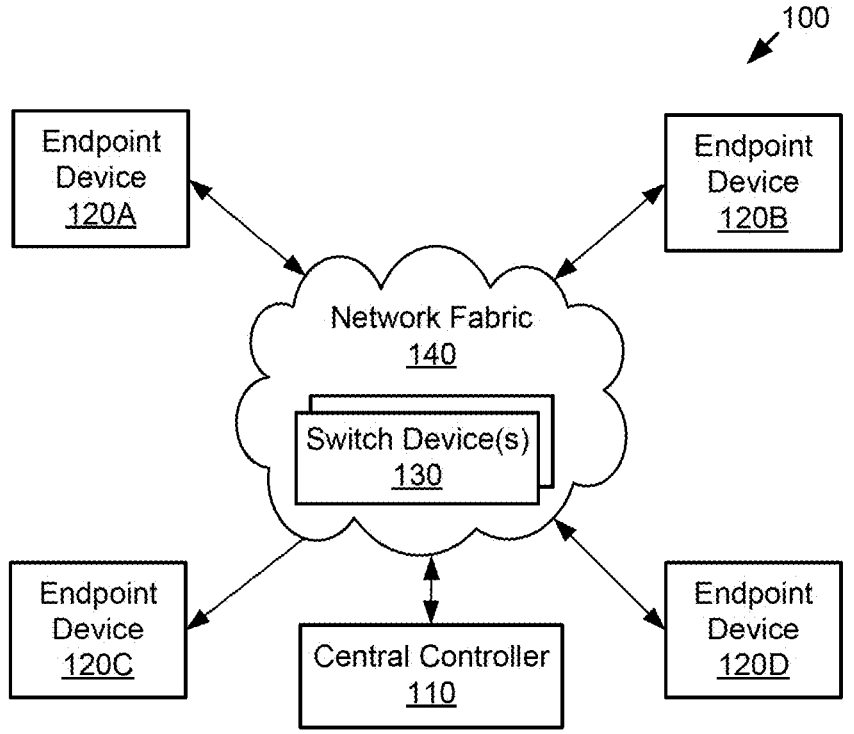
FIGS. 1A-1C are schematic diagrams of an example storage network and components, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, a storage network system may include compute nodes and storage devices coupled via network links (also referred to herein as a "network fabric"). For example, such network links may be implemented using the Non-Volatile Memory Express over Fabrics (NVMe-oF) protocol. In some examples, the storage network system may include physical storage devices, physical compute nodes, physical switch devices, virtual storage devices, virtual compute nodes, virtual switch devices, or any combination thereof. A storage device may include or manage any number of storage components to persistently store data. For example, a storage device may be a controller for a storage array including multiple non-volatile storage drives. A compute node may be a computing device (e.g., a server, controller, etc.) that can access the data stored in the storage devices. Each compute node and storage device may be referred to as a terminal or "endpoint" device that sends or receives data packets via the network fabric. As used herein, a "source device" may be the endpoint device that generates a packet, and a "destination device" may be the endpoint device that receives the packet. Further, a "switch device" may be a network device that can direct and/or transfer data between the endpoint devices.

In some examples, the devices of the storage network system may be separated into different groups or "zones" to provide data privacy and/or security. The zones may be defined by access rules (also referred to herein as "zone rules") that specify how data may be accessed in the zones. The zones rules may be evaluated and applied by switch devices that receive packets for forwarding to their respective destinations. For example, a switch device may include a first zone rule that identifies a first source device that is allowed to send packets to a destination device, but does not include any zone rules that allow a second source device to send packets to the destination device. In this example, the switch device will allow a first packet to be sent from the first source device to the destination device, but will block a second packet that is sent from the second source device to the destination device. In this manner, the zone rules may prevent devices from communicating with and/or accessing the devices in a different zone. As used herein, the term "zoning" may refer to controlling (e.g., allowing or blocking) communication between devices based on their assigned zones.

In some examples, the zone rules may be defined using multiple values that are embedded in a packet. For example, a zone rule may specify a source internet protocol (IP) address, a destination IP address, a communication protocol, a source device identifier, and/or a destination device identifier. Upon receiving a packet, a switch device may read the packet to obtain the embedded values. If the embedded values match the zone rule, the switch device may send the packet to the destination device. In some examples, the source and destination device identifiers may be global identifiers having a particular data size (e.g., 224 bytes). As used herein, a "global identifier" refers to an identifier that is unique across multiple network systems or domains (i.e., is "globally" unique). In some examples, the global device identifiers may be embedded in a data payload portion of the packet. The data payload portion may have a relatively deep location within the packet (e.g., closer to the ending than the beginning of the packet). As such, reading the global device identifiers may include parsing a substantial portion (e.g., more than 50%) of the packet to locate and read the appropriate fields (also referred to herein as "deep packet inspection"). In such examples, obtaining the global device identifiers (e.g., to evaluate a zone rule) may consume a significant amount of processing bandwidth to perform deep packet inspection of each packet. Further, in some examples, a significant amount of the memory in a switch device (e.g., ternary content-addressable memory) may be consumed to store the global device identifiers while evaluating the zone rule.

As described further below with reference to FIGS. 1A-10, some implementations may provide a central controller to assign local identifiers to devices in a storage network system. For each device, the central controller may apply a function to a global identifier of the device to generate a local identifier that is unique within that storage network system, and that is significantly smaller than the global identifier. As used herein, a "local identifier" refers to an identifier that is unique within a single network system. Each local identifier may be distributed to all devices in the storage network system. In some implementations, the zone rules for the storage network system may be specified using the local identifiers. A packet transmitted in the storage network system may include the local identifiers of the source and destinations devices. These local identifiers may be embedded in a relatively shallow location within the packet (e.g., closer to the beginning than the ending of the packet). For example, in some implementations, the local identifiers may be embedded in a header portion of the packet (e.g., in a packet specific header). Accordingly, a switch device may obtain the local identifiers (e.g., during zoning) without performing deep packet inspection of the packet, thereby improving the performance of the switch device. Further, because the local identifiers are smaller than the global identifiers, less memory is required in the switch device to store the local identifiers. In this manner, the amount of memory used for zoning may be reduced in some implementations.

Figure 1B:
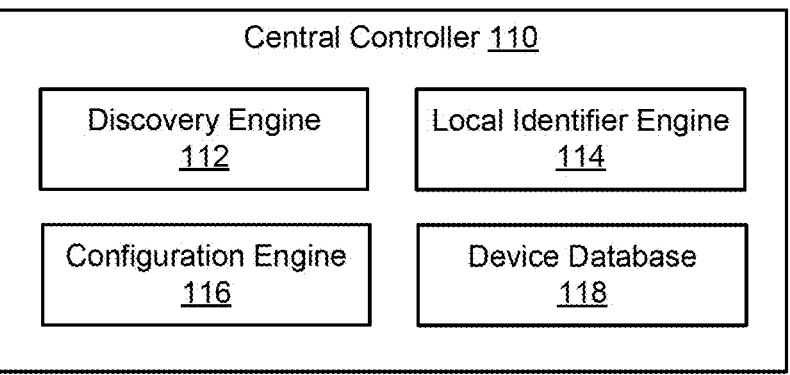
Figure 1C:
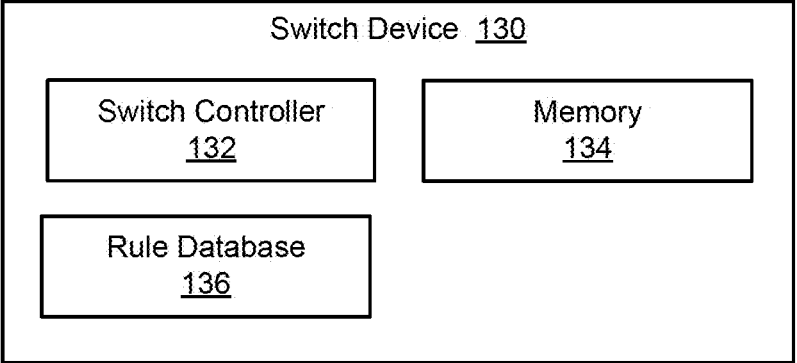

FIGS. 1A-1C—Example Network System and Components

FIG. 1A shows an example of a network system 100, in accordance with some implementations. The network system 100 may include any number and type of devices, including a central controller 110, endpoint devices 120A-120D, and one or more switch devices 130. The endpoint devices 120A-120D (also referred to herein as "endpoint devices 120") may be physical and/or virtual devices, including compute nodes, storage devices, or components thereof. For example, the endpoint device 120A may be a computing device or host (e.g., a computer server including a processor, memory, and persistent storage). Further, in this example, the endpoint device 120B may be all or part of a storage device (e.g., storage subsystem, storage controller, storage array, hard disk drive(s), solid state drive(s), optical disk(s), and so forth). In this example, the endpoint device 120A may send a request to obtain data stored in the endpoint device 120B. Further, a switch device 130 may transfer the request from the endpoint device 120A to the endpoint device 120B. The switch device 130 and the endpoints devices 120 may be interconnected by any number of links in a network fabric 140. A "link" can refer to a communication medium (wired and/or wireless) over which devices can communicate with one another.

In some implementations, the central controller 110 may be a Centralized Discovery Controller (CDC) that provides automated discovery of devices in an NVMe-OF network system. An example implementation of the central controller 110 is described below with reference to FIG. 1B. Further, an example implementation of the switch device 130 is described below with reference to FIG. 1C. In some implementations, the network system 100 can be configured for a particular task or purpose. For example, in some implementations, the network system 100 may be a Storage Area Network (SAN) implementing one or more network protocols (e.g., the NVMe-oF protocol, the Internet Small Computer Systems Interface (iSCSI) protocol, and so forth). Although FIG. 1A shows an example implementation of the network system 100, other implementations are possible. For example, it is contemplated that the network system 100 may include additional devices and/or components, fewer components, different components, different arrangements, and so forth.

Referring now to FIG. 1B, shown is an example implementation of a central controller 110. In some implementations, the central controller 110 may include a discovery engine 112, a local identifier engine 114, a configuration engine 116, and a device database 118. Some or all of the engines 112, 114, 116 may be implemented via hardware (e.g., electronic circuitry), or via a combination of hardware and programming (e.g., comprising at least one processor and instructions executable by the at least one processor). In implementations using executable instructions, such instructions may be stored in machine-readable storage media, in hardware (e.g., circuitry), and so forth. Although FIG. 1B shows an example in which the engines 112, 114, 116 are implemented in a single central controller 110, in other examples, the engines 112, 114, 116 may be implemented in distinct devices or services. Further, it is contemplated that the central controller 110 may include additional devices and/or components, fewer components, different components, different arrangements, and so forth.

In some implementations, the discovery engine 112 may perform discovery of all devices in the network system 100. Further, the device database 118 may be a data structure to store information regarding each of the discovered devices. Such information may include device identifiers, device configuration, storage configuration, namespaces, data locations, network connections, status, performance, and so forth. In some implementations, the discovery engine 112 may obtain the discovery information via a registration process initiated by the devices. For example, when a new endpoint device 120 is added to the network system 100, the endpoint device 120 may discover (e.g., via a search function) the central controller 110, and may initiate a registration with the central controller 110 (via the discovery engine 112). Further, upon registering the new endpoint device 120, the discovery engine may add an identifier (and other information) for the new endpoint device 120 to the device database 118. However, in other implementations, the discovery engine 112 may obtain the discovery information by polling the devices in the network system 100.

In some implementations, the local identifier engine 114 may generate a local identifier for each device that is registered in the network system 100. For example, the local identifier engine 114 may generate a local identifier for a device by applying one or more hash functions to a global identifier of that device. Further, the local identifier engine 114 may store each local device identifier in the device database 118, and may send the local device identifiers to all devices of the network system 100. In some implementations, the local device identifier may be a value that is unique within the network system 100 and may be significantly smaller than the global device identifier. The functionality of the local identifier engine 114 is described further below with reference to FIGS. 2-3.

In some implementations, the configuration engine 116 may provide configuration of zones in the network system 100. Each zone may include a subset of devices that can communicate with each other. For example, the configuration engine 116 may receive user inputs or commands to specify zone rules. In some implementations, the zone rules may be specified using the local device identifiers (e.g., generated by the local identifier engine 114).

Referring now to FIG. 1C, shown is an example implementation of a switch device 130. In some implementations, the switch device 130 may include a switching controller 132, memory 134, and a rule database 136. The switching controller 132 may be implemented via hardware (e.g., electronic circuitry), or via a combination of hardware and programming (e.g., comprising at least one processor and instructions executable by the at least one processor). In implementations using executable instructions, such instructions may be stored in machine-readable storage media, in hardware (e.g., circuitry), and so forth. Although FIG. 1C shows an example implementation of the switch device 130, other implementations are possible. For example, it is contemplated that the switch device 130 may include additional devices and/or components, fewer components, different components, different arrangements, and so forth.

In some implementations, the switching controller 132 may route and/or transfer data packets between endpoint devices. The memory 134 may be ternary content-addressable memory (TCAM), and may be searched as a whole in a single clock cycle. The rule database 136 may a data structure to store a set of zone rules that are defined for the storage network 100. For example, the rule database 156 may store zone rules received from the configuration engine 116 (included in the central controller 110). In another example, the rule database 136 may store zone rules that are received from external users or client devices (not shown in FIGS. 1A-1C).

In some implementations, the switching controller 132 may detect each packet received by the switch device 130 (e.g., from a source device), and may determine whether the packet includes a connect command to establish a data connection between the source device and the destination device (e.g., a NVMe-oF Connect command). If the packet does include the connect command, the switching controller 132 may evaluate the packet against the zones rules in the rule database 136. For example, the switching controller 132 may read the packet to extract local identifiers of the source device and the destination device. The switching controller 132 may extract the local identifiers from a header portion of the packet (e.g., without performing deep packet inspection of the packet), and may store the extracted local identifiers in the memory 134. The switching controller 132 may then attempt to match the local identifiers (in the memory 134) against the zone rules (in the rule database 136). In some implementations, the local identifiers may be smaller than the global identifiers. As such, using local identifiers to perform zoning may use a smaller amount of memory 134 in comparison to using global identifiers to perform zoning.

If the extracted local identifiers match a zone rule, the switching controller 132 may allow the packet to be sent to the destination device. Otherwise, if the local identifiers do not match any zone rule, the switching controller 132 may block the packet from being sent to the destination device (e.g., by dropping the packet). In this manner, the switching controller 132 may reduce the processing load to perform zoning in the switch device 130. The functionality of the switching controller 132 is described further below with reference to FIGS. 6-7B.

Figure 2:
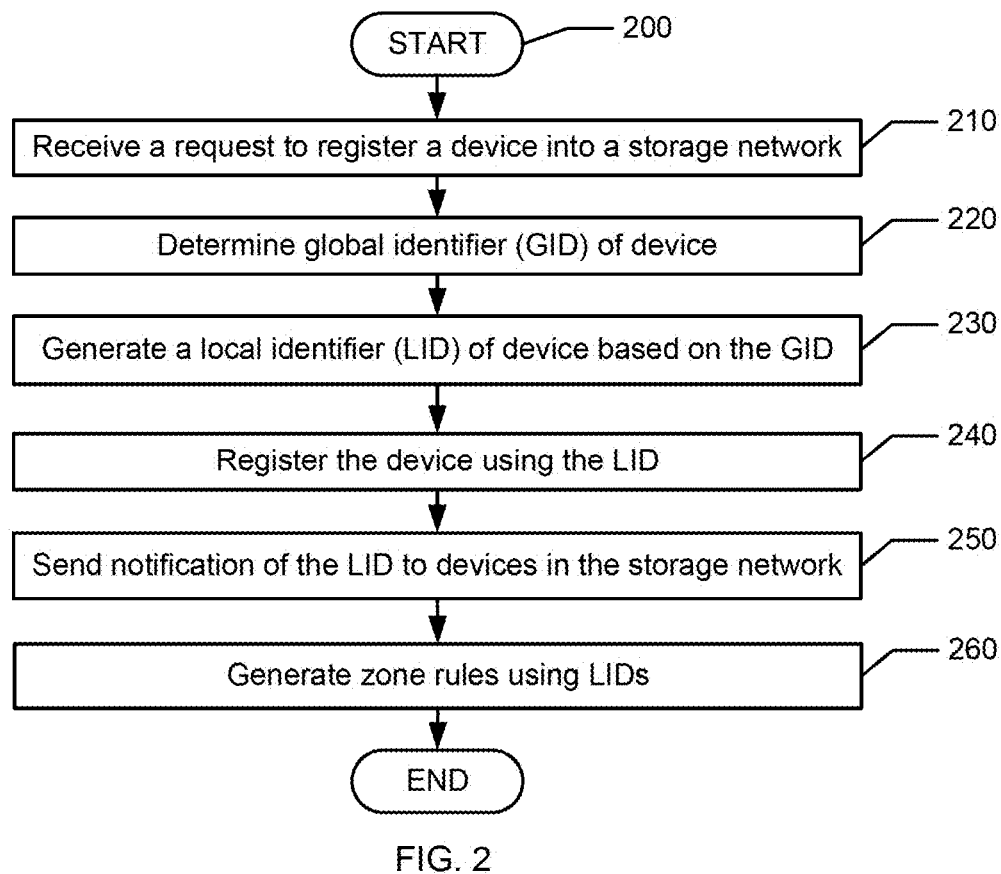
FIG. 2 is an illustration of an example process, in accordance with some implementations.
Figure 3:
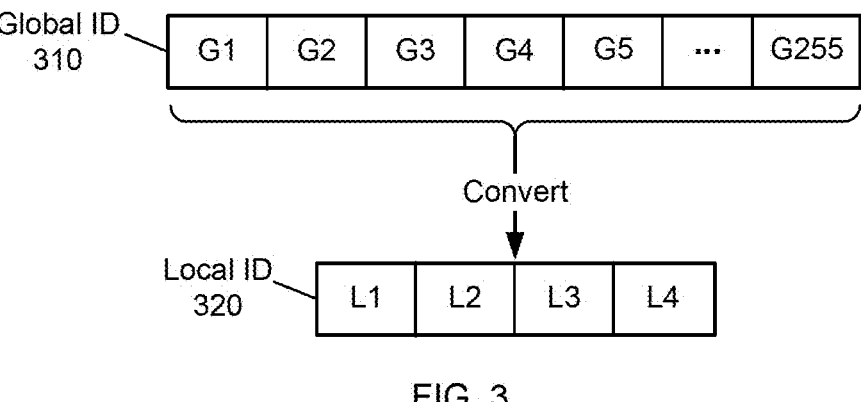
FIG. 3 is a schematic diagram of example data structures, in accordance with some implementations.

FIGS. 2-3—Example Process for Generating a Local Identifier

FIG. 2 shows an example process 200 for generating a local identifier, in accordance with some implementations. In some examples, the process 200 may be performed by some or all of the network system 100 (shown in FIG. 1A). The process 200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 200 may be described below with reference to FIGS. 1A-1C and 3, which show some example implementations. However, other implementations are also possible.

Block 210 may include receiving a request to register a device into a storage network. Block 220 may include determining a global identifier (GID) of device. For example, referring to FIGS. 1A, a new endpoint device 120D is added to the network system 100, and searches for a device discovery service or controller. The new endpoint device 120D finds the central controller 110, and sends a registration request to the central controller 110. The central controller 110 receives and reads the registration request to obtain information regarding the new endpoint device 120D. The obtained information may include a global identifier of the new endpoint device 120D, a transport address, a transport family, and so forth.

Referring again to FIG. 2, block 230 may include generating a local identifier (LID) of device based on the global identifier (GID). For example, referring to FIGS. 1A and 3, the central controller 110 applies a function to convert the global identifier 310 into the local identifier 320. In some implementations, the global identifier may be a NVMe Qualified Name (NON) of the new endpoint device 120D. The global identifier 310 may include up to 255 bytes, and may be configured or specified to be unique in multiple network systems (e.g., is unique beyond the network system 100). Further, in some implementations, the local identifier 320 may include four bytes, and may be configured or specified to be unique within the network system 100. The first byte of the local identifier 320 may be generated by extracting a unique 8-bit number from vendor information included in the NON (e.g., from the first 16 bytes in the NQN). Further, the second, third and fourth bytes of the local identifier 320 may be generated by applying one or more rounds of a Secure Hash Algorithm (SHA) function to the remaining portion of the NQN. After performing the first SHA round, the local identifier 320 is compared to previous local identifiers in the network system 100 (e.g., by performing a look-up in the device database 118 shown in FIG. 1B). If the local identifier 320 has a collision (i.e., matches) with a previous local identifier, another SHA round may be performed (e.g., by applying a different SHA algorithm to the remaining portion of the NQN). This process may be repeated for multiple rounds until the local identifier 320 does not collide with a previous local identifier. Further, if an available set of SHA algorithms does not produce a local identifier 320 that does not collide with the previous local identifiers, the local identifier 320 may be generated by performing a linear probing technique until no collision is present.

Referring again to FIG. 2, block 240 may include registering the device using the local identifier (LID). Block 250 may include sending a notification of the LID to devices in the storage network. For example, referring to FIGS. 1A-1B, the central controller 110 creates an entry for the new endpoint device 120 in the device database 118. The created entry includes the local identifier (generated at block 230) for the new endpoint device 120. The central controller 110 may provide the local identifier to the new endpoint device 120, and to other devices in the network system 100. For example, the central controller 110 may receive a "get log page" request, and in response may return a list of all local identifiers that have been created for the devices in the network system 100.

Referring again to FIG. 2, block 260 may include generating zone rules using LIDs. After block 260, the process 200 may be completed. For example, referring to FIGS. 1A-1C, the central controller 110 receives zone rules that are defined using the local identifiers of the devices in the storage network 100. The central controller 110 may distribute the zone rules to the switch devices 130. Each switch device 130 may include a rule database 136 to store zone rules.

Figure 4:
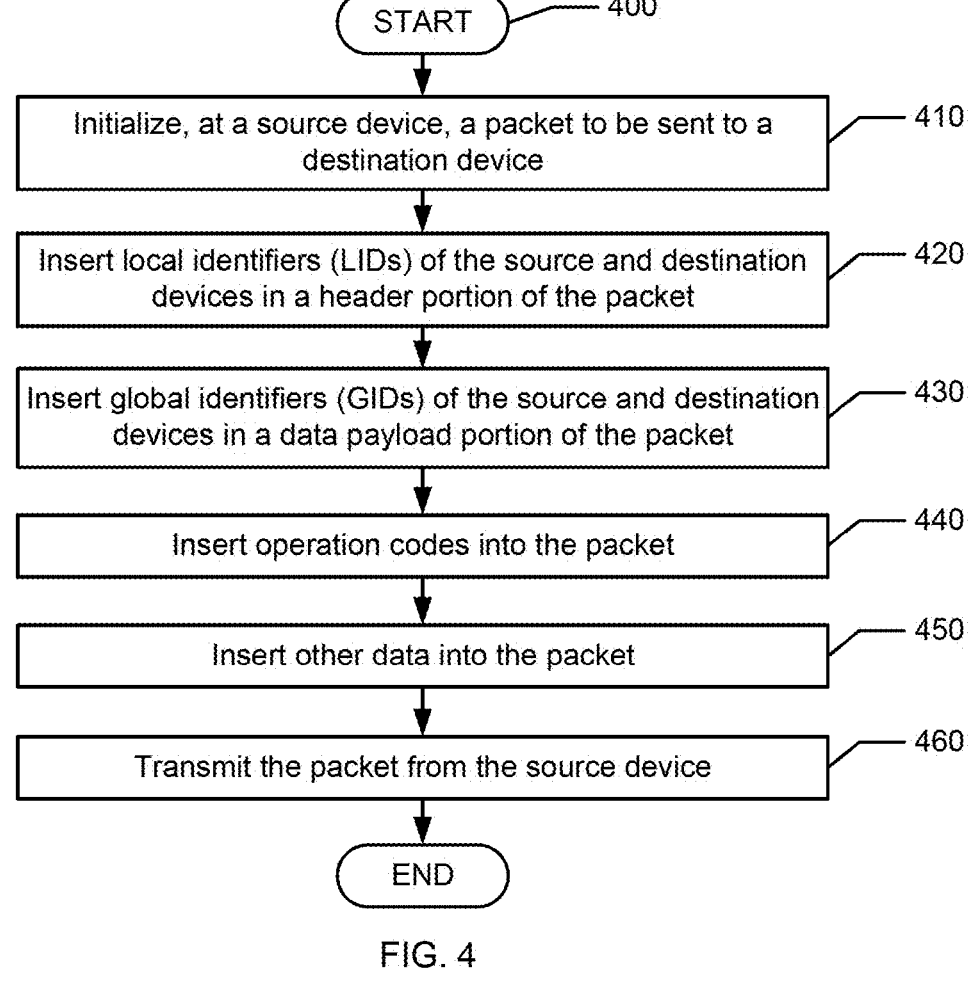
FIG. 4 is an illustration of an example process, in accordance with some implementations.
Figure 5:
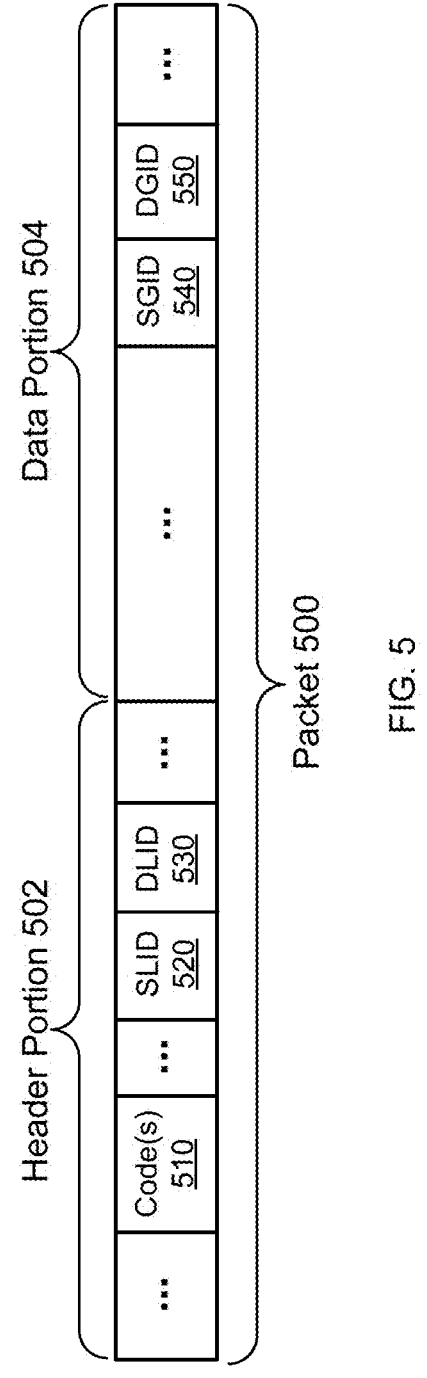
FIG. 5 is a schematic diagram of an example data structure, in accordance with some implementations.

FIG. 4-5—Example Process for Packet Generation

FIG. 4 shows an example process 400 for packet generation, in accordance with some implementations. In some examples, the process 400 may be performed by some or all of the network system 100 (shown in FIG. 1A). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 may be described below with reference to FIGS. 1A-1C and 5, which show some example implementations. However, other implementations are also possible.

Block 410 may include initializing, at a source device, a packet to be sent to a destination device. Block 420 may include inserting local identifiers (LIDs) of source and destination devices in a header portion of the packet. For example, referring to FIGS. 1A and 5, a source endpoint device 120A generates a packet 500 to be sent to a destination endpoint device 120B. The source endpoint device 120A inserts a source local identifier (SLID) 520 (i.e., a local device identifier of the source endpoint device 120A) into a header portion 502 of the packet 500. Further, the source endpoint device 120A also inserts a destination local identifier (DLID) 530 (i.e., a local device identifier of the destination endpoint device 120B) into the header portion 502. In some implementations, the SLID 520 is generated and assigned (e.g., by central controller 110) to the endpoint device 120A when the endpoint device 120A is registered into the network system 100. Further, the DLID 530 is generated and assigned to the endpoint device 120B when the endpoint device 120B is registered into the network system 100.

Referring again to FIG. 4, block 430 may include inserting global identifiers (GIDs) of the source and destination devices in a data payload portion of the packet. For example, referring to FIGS. 1A and 5, the source endpoint device 120A inserts a source global identifier (SGID) 540 (i.e., a global device identifier of the source endpoint device 120A) into a data portion 504 of the packet 500. Further, the source endpoint device 120A also inserts a destination global identifier (DGID) 550 (i.e., a global device identifier of the destination endpoint device 120B) into the data portion 504. In some implementations, the data portion 504 may have a larger offset in the packet 500 (i.e., distance from the beginning of the packet) than the header portion 502. For example, the beginning data unit of the packet 500 (e.g., the first byte or bit in an order of writing or reading the packet 500) may have a lowest address number (e.g., zero). Further, a subsequent data unit of the packet 500 may be addressed with an "offset" value that indicates the distance (e.g., in terms of number of data units) that separates the subsequent data unit from the beginning data unit. For example, a first data unit with a relatively larger offset may be further from the beginning of the packet 500 than a second data unit with a relatively smaller offset. Further, in this example, the first data unit may be described as being "deeper" in the packet 500 than the second data unit, and the second data unit may be described as being "shallower" in the packet 500 than the first data unit.

Referring again to FIG. 4, block 440 may include inserting operation codes into the packet. Block 450 may include inserting other data into the packet. Block 460 may include transmitting the packet from the source device. After block 460, the process 400 may be completed. For example, referring to FIGS. 1A and 5, the source endpoint device

120A inserts operation code(s) 510 into the header portion 502. The operation code(s) 510 may identify a particular command or action to be performed (e.g., by the destination endpoint device 120B) in response to receiving the packet 500. For example, a particular set of operation code(s) 510 may identify a connect command to establish a data connection between the source device and the destination device. Further, the source endpoint device 120A populates other data fields (not shown in FIG. 5) into the header portion 502 and data portion 504 (e.g., header fields, data validation fields, data payload fields, and so forth). The source endpoint device 120A then sends the completed packet 500 to the switch device 130 (e.g., to be routed to the destination endpoint device 120B).

Figure 6:
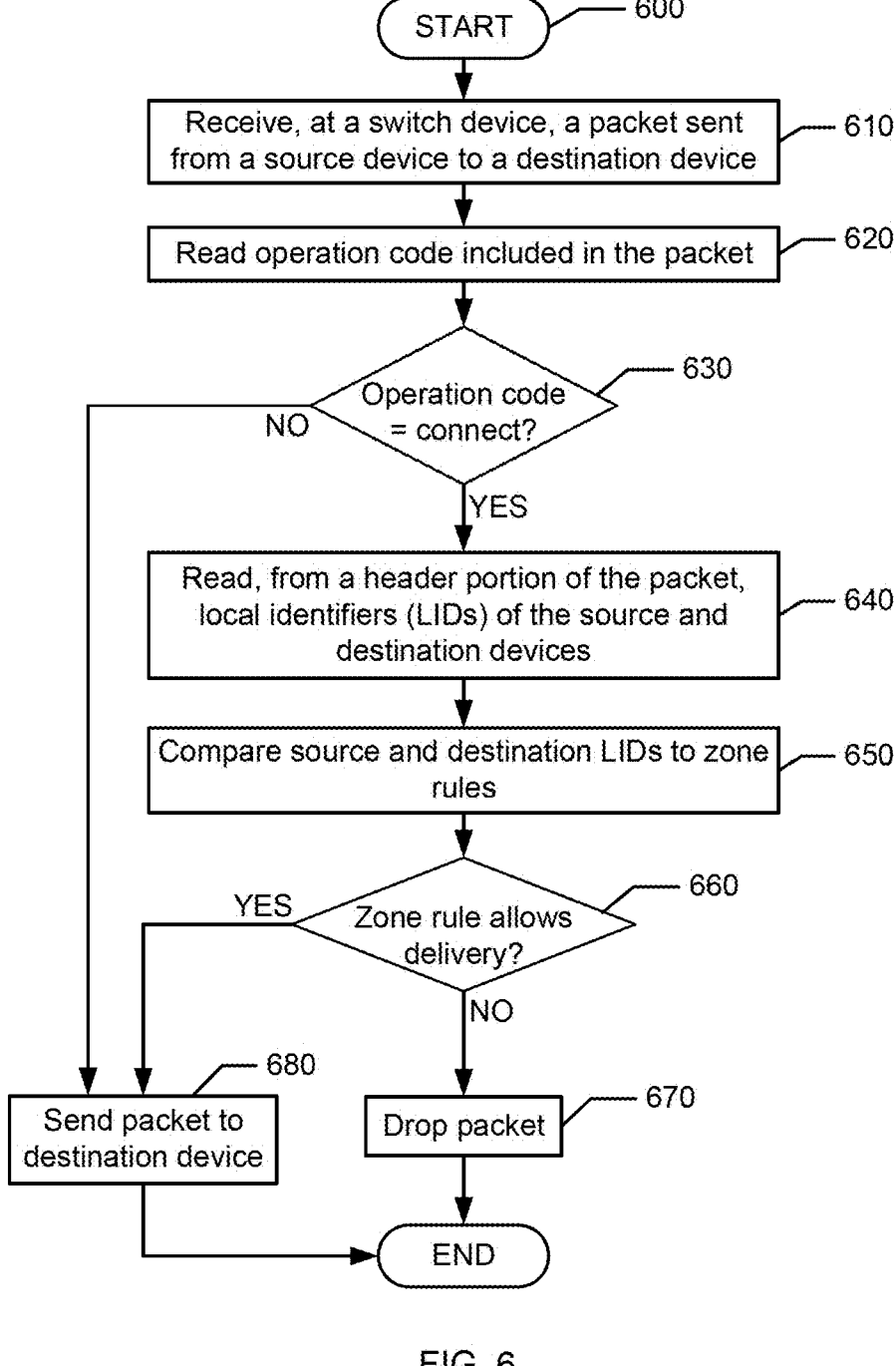
FIG. 6 is an illustration of an example process, in accordance with some implementations.
Figures 7A, 7B:
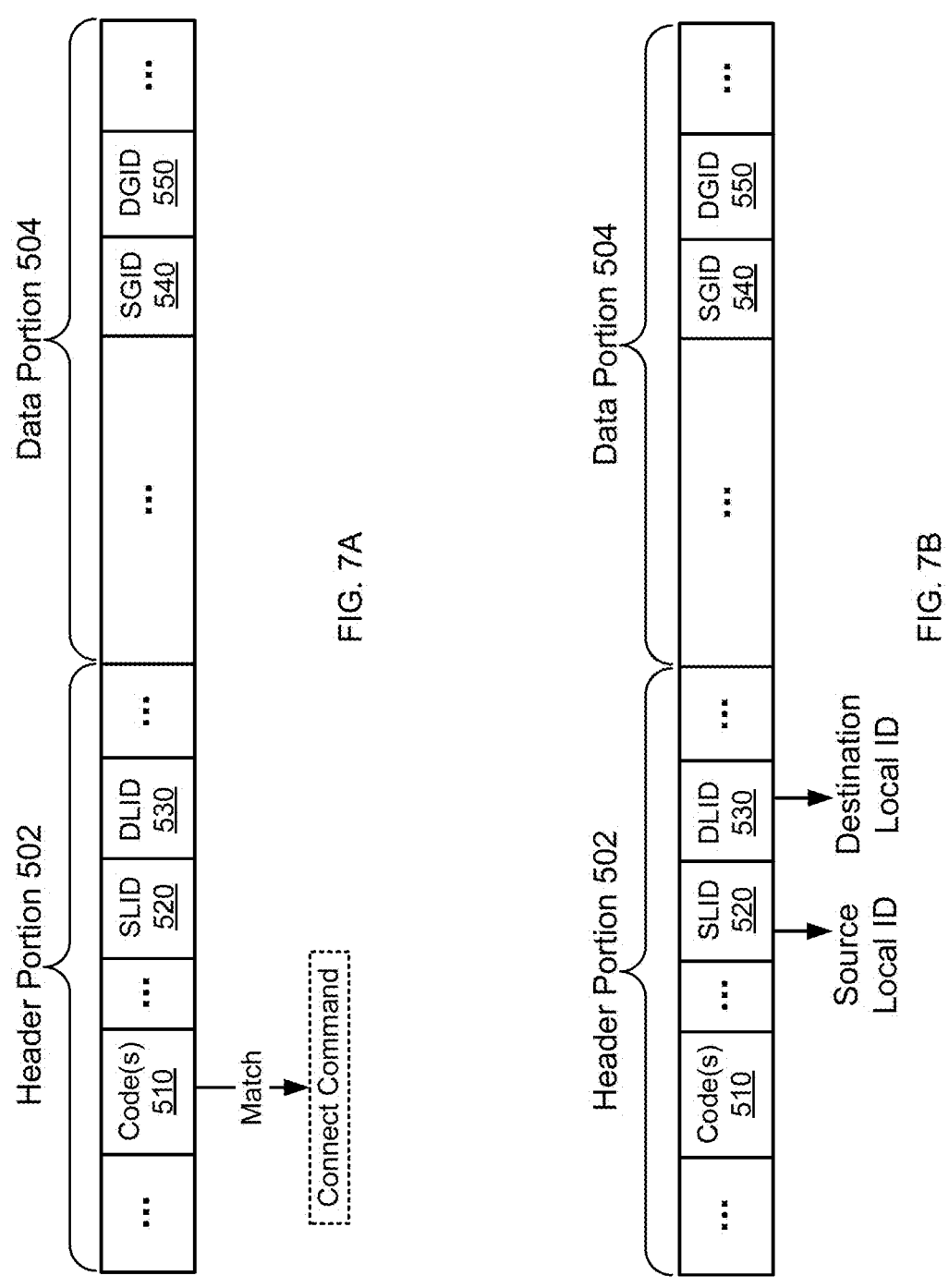
FIGS. 7A-7B are illustrations of example operations, in accordance with some implementations.

FIGS. 6 and 7A-7B—Example Process for Zoning

FIG. 6 shows an example process 600 for zoning, in accordance with some implementations. In some examples, the process 600 may be performed by some or all of the network system 100 (shown in FIG. 1A). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1A-1C and 7A-7B, which show some example implementations. However, other implementations are also possible.

Block 610 may include receiving, at a switch device, a packet sent from a source device to a destination device. Block 620 may include reading an operation code included in the packet. Decision block 630 may include determining whether the operation code matches a connect command code. If it is determined at decision block 630 that the operation code does not match the connect command code ("NO"), the process 600 may continue at block 680, including sending the packet to the destination device. For example, referring to FIGS. 1C and 7A, the switch device 130 receives a packet 500 from a source endpoint device 120A. The switch device 130 extracts an operation code 510 (or multiple operation codes 510) from a header portion 502 of the packet 500. Further, the switch device 130 determines that the extracted operation code 510 does not match a connect command code (e.g., a code identifying a NVMe-oF connect command to establish a connection between endpoint devices), and in response sends the packet to the destination endpoint device 120B. In some implementations, a packet that does not include a connect command code can be transmitted only if there is an existing connection between the source and destination device (i.e., a connection established by an earlier connect command). Accordingly, in such implementations, the switch device 130 allows the packet that does not include a connect command code to be delivered (e.g., via the existing connection between source and destination devices).

Referring again to FIG. 6, if it is determined at decision block 630 that the operation code matches the connect command code ("YES"), the process 600 may continue at block 640, including reading, from a header portion of the packet, the local identifiers (LIDs) for the source and destination devices. Block 650 may include comparing the source and destination LIDs to a set of zone rules. Decision block 660 may include determining whether a zone rule allows delivery of the packet to the destination device. For example, referring to FIGS. 1C and 7B, in response to a determination that the extracted operation code 510 matches the connect command code, the switch device 130 extracts the source local identifier (SLID) 520 and the destination local identifier (DLID) 530 from the header portion 502 of the packet. Further, the switch device 130 determines whether the combination of the SLID 520 and the DLID 530 matches any zone rule stored in the rule database 136. In some implementations, a data portion 504 of the packet 500 may include a source global identifier (SGID) 540 and a destination global identifier (DGID) 550. The data portion 504 may have a larger offset in the packet 500 (i.e., is further from the beginning of the packet) than the header portion 502. In some implementations, parsing the content of the data portion 504 may require relatively more processing than parsing the content of the header portion 502. For example, parsing the content of the data portion 504 may involve relatively more processing to identify and remove header(s), to parse one or more fields within the data portion 504, to locate delimiters, and so forth.

Referring again to FIG. 6, if it is determined at decision block 660 that no zone rule allows delivery of the packet to the destination device ("NO"), the process 600 may continue at block 670, including dropping the packet (i.e., without delivering the packet to the destination device). Otherwise, if it is determined at decision block 660 that a zone rule allows delivery of the packet to the destination device ("YES"), the process 600 may continue at block 680, including sending the packet to the destination device. After either block 670 or block 680, the process 600 may be completed. For example, referring to FIG. IC, the switch device 130 allows the packet to be delivered if the combination of the SLID 520 and the DLID 530 matches a zone rule in the rule database 136. Otherwise, the switch device 130 drops the packet if the combination of the SLID 520 and the DLID 530 does not match any zone rule in the rule database 136.

FIG. 8—Example Network Device

FIG. 8 shows a schematic diagram of an example network device 800. In some examples, the network device 800 may correspond generally to some or all of the switch device 130 (shown in FIG. 1A). As shown, the network device 800 may include a hardware processor 802 and machine-readable storage 805 including instructions 810-840. The machine-readable storage 805 may be a non-transitory medium. The instructions 810-840 may be executed by the hardware processor 802, or by a processing engine included in hardware processor 802.

Instruction 810 may be executed to receive a packet sent from a source device to a destination device in a storage network, where the packet includes a local identifier of the source device, a global identifier of the source device, a local identifier of the destination device, and a global identifier of the destination device. Instruction 820 may be executed to read the local identifier of the source device at a first offset in the packet, where the global identifier of the source device is located at a second offset that is larger than the first offset. In some implementations, the second offset may be variable across multiple packets. Further, the first offset may be constant across multiple packets.

Instruction 830 may be executed to read the local identifier of the destination device at a third offset in the packet, where the global identifier of the destination device is located at a fourth offset that is larger than the third offset. Instruction 840 may be executed to, in response to a determination that a combination of the local identifiers for the source and destination devices matches a predefined zone rule, cause a delivery of the packet to the destination device.

For example, referring to FIGS. 1C and 7B, the switch device 130 extracts the source local identifier (SLID) 520 and the destination local identifier (DLID) 530 from the header portion 502 of the packet. The packet 500 also includes a source global identifier (SGID) 540 and a destination global identifier (DGID) 550 at a data portion 504 that has a larger offset than the header portion 502. The switch device 130 determines that the combination of the SLID 520 and the DLID 530 matches a zone rule stored in the rule database 136, and in response allows the packet to be delivered to the destination device.

FIG. 9—Example Machine-Readable Medium

FIG. 9 shows a machine-readable medium 900 storing instructions 910-940, in accordance with some implementations. The instructions 910-940 can be executed by a single processor, multiple processors, a single processing engine, multiple processing engines, and so forth. The machine-readable medium 900 may be a non-transitory storage medium, such as an optical, semiconductor, or magnetic storage medium. The instructions 910-940 may correspond generally to the examples described above with reference to instructions 810-840 (shown in FIG. 8).

Instruction 910 may be executed to receive a packet sent from a source device to a destination device in a storage network, where the packet includes a local identifier of the source device, a global identifier of the source device, a local identifier of the destination device, and a global identifier of the destination device. Instruction 920 may be executed to read the local identifier of the source device at a first offset in the packet, where the global identifier of the source device is located at a second offset that is larger than the first offset.

Instruction 930 may be executed to read the local identifier of the destination device at a third offset in the packet, where the global identifier of the destination device is located at a fourth offset that is larger than the third offset. Instruction 940 may be executed to, in response to a determination that a combination of the local identifiers for the source and destination devices matches a predefined zone rule, cause a delivery of the packet to the destination device.

Figure 10:
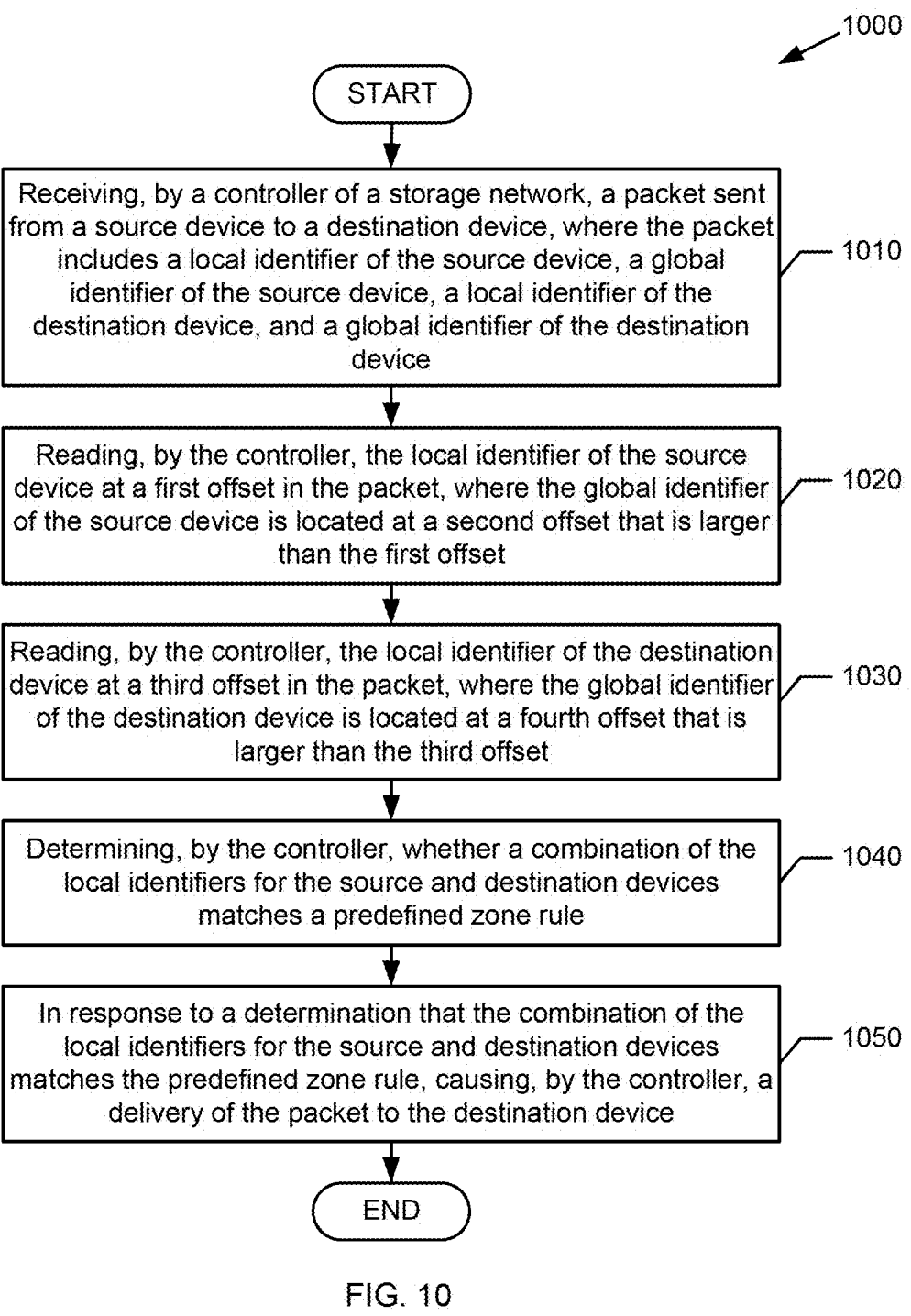
FIG. 10 is an illustration of an example process, in accordance with some implementations.

FIG. 10—Example Process

FIG. 10 shows an example process 1000, in accordance with some implementations. In some examples, the process 1000 may be performed using a controller of the switch device 130 (shown in FIG. 1). The process 1000 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. However, other implementations are also possible.

Block 1010 may include receiving, by a controller of a storage network, a packet sent from a source device to a destination device, where the packet includes a local identifier of the source device, a global identifier of the source device, a local identifier of the destination device, and a global identifier of the destination device. Block 1020 may include reading, by the controller, the local identifier of the source device at a first offset in the packet, where the global identifier of the source device is located at a second offset that is larger than the first offset. Block 1030 may include reading, by the controller, the local identifier of the destination device at a third offset in the packet, where the global identifier of the destination device is located at a fourth offset that is larger than the third offset.

Block 1040 may include determining, by the controller, whether a combination of the local identifiers for the source and destination devices matches a predefined zone rule. Block 1050 may include, in response to a determination that the combination of the local identifiers for the source and destination devices matches the predefined zone rule, causing, by the controller, a delivery of the packet to the destination device. Blocks 1010-1050 may correspond generally to the examples described above with reference to instructions 810-840 (shown in FIG. 8).

In accordance with some implementations described herein, a central controller may assign local identifiers to devices in a storage network system. For each device, the central controller may apply a function to a global identifier of the device to generate a local identifier that is unique within that storage network system, and that is significantly smaller than the global identifier. Each local identifier may be distributed to all devices in the storage network system. In some implementations, the zone rules for the storage network system may be specified using the local identifiers. A packet transmitted in the storage network system may include the local identifiers of the source and destinations devices. These local identifiers may be embedded in a header portion of the packet. The switch device may obtain the local identifiers to evaluate the packet against zone rules without performing deep packet inspection of the packet. Further, because the local identifiers are smaller than the global identifiers, less memory may be required in the switch device to store the local identifiers. In this manner, the performance of the switch device may be improved in some implementations.

Note that, while FIGS. 1A-10 show various examples, implementations are not limited in this regard. For example, referring to FIG. 1A, it is contemplated that the network system 100 may include additional devices and/or components, fewer components, different components, different arrangements, and so forth. In another example, it is contemplated that the functionality of the central controller 110 described above may be included in any another engine or software of the network system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

What is claimed is:

1. A network device comprising:

a processor; and a machine-readable storage storing instructions, the instructions executable by the processor to:

receive a packet sent from a source device to a destination device in a storage network, wherein the packet includes a local identifier of the source device, a global identifier of the source device, a local identifier of the destination device, and a global identifier of the destination device;

read the local identifier of the source device at a first offset in the packet, wherein the global identifier of the source device is located at a second offset that is larger than the first offset;

read the local identifier of the destination device at a third offset in the packet, wherein the global identifier of the destination device is located at a fourth offset that is larger than the third offset; and in response to a determination that a combination of the local identifiers for the source and destination devices matches a predefined zone rule, cause a delivery of the packet to the destination device.

2. The network device of claim 1, wherein:

the local identifiers of the source and destination devices are included in a header portion of the packet; and the global identifiers of the source and destination devices are included in a data payload portion of the packet.

3. The network device of claim 1, including instructions executable by the processor to:

determine whether the packet includes a connect command to establish a connection between the source device and the destination device; and read the local identifiers for the source and destination devices in response to a determination that the packet includes the connect command to establish the connection between the source device and the destination device.

4. The network device of claim 3, including instructions executable by the processor to:

read an operation code at a fifth offset in the packet;

determine whether the operation code identifies the connect command; and upon a determination that the operation code identifies the connect command, determine that the packet includes the connect command.

5. The network device of claim 1, wherein the local identifier of the source device is generated by applying at least one hash function to the global identifier of the source device, and wherein the local identifier of the source device is a smaller data string than the global identifier of the source device.

6. The network device of claim 1, wherein:

the local identifiers of the source and destination devices are configured to be unique within the storage network; and the global identifiers of the source and destination devices are configured to be unique across multiple storage networks.

7. The network device of claim 1, wherein the second offset is variable across a plurality of packets, and wherein the first offset is constant across the plurality of packets.

8. The network device of claim 1, wherein the global identifiers of the source and destination devices are Non-Volatile Memory Express Qualified Names (NQNs).

9. A method comprising:

receiving, by a controller of a storage network, a packet sent from a source device to a destination device, wherein the packet includes a local identifier of the source device, a global identifier of the source device, a local identifier of the destination device, and a global identifier of the destination device;

reading, by the controller, the local identifier of the source device at a first offset in the packet, wherein the global identifier of the source device is located at a second offset that is larger than the first offset;

reading, by the controller, the local identifier of the destination device at a third offset in the packet, wherein the global identifier of the destination device is located at a fourth offset that is larger than the third offset;

determining, by the controller, whether a combination of the local identifiers of the source and destination devices matches a predefined zone rule; and in response to a determination that the combination of the local identifiers of the source and destination devices matches the predefined zone rule, causing, by the controller, a delivery of the packet to the destination device.

10. The method of claim 9, wherein the controller is included in a switch device of the storage network.

11. The method of claim 9, wherein:

receiving, by a central discovery controller of the storage network, a registration request from the source device; and generating, by the central discovery controller, the local identifier of the source device by applying at least one hash function to the global identifier of the source device, wherein the local identifier of the source device is a smaller data string than the global identifier of the source device.

12. The method of claim 9, comprising:

determining whether the packet includes a connect command to establish a connection between the source device and the destination device; and reading the local identifiers for the source and destination devices in response to a determination that the packet includes the connect command to establish the connection between the source device and the destination device.

13. The method of claim 12, comprising:

reading an operation code at a fifth offset in the packet;

determining whether the operation code identifies the connect command; and upon a determination that the operation code identifies the connect command, determining that the packet includes the connect command.

14. The method of claim 9, wherein:

the local identifiers of the source and destination devices are configured to be unique within the storage network; and the global identifiers of the source and destination devices are configured to be unique across multiple storage networks.

15. A non-transitory machine-readable medium storing instructions that upon execution cause a controller to:

receive a packet sent from a source device to a destination device in a storage network, wherein the packet includes a local identifier of the source device, a global identifier of the source device, a local identifier of the destination device, and a global identifier of the destination device;

read the local identifier of the source device at a first offset in the packet, wherein the global identifier of the source device is located at a second offset that is larger than the first offset;

read the local identifier of the destination device at a third offset in the packet, wherein the global identifier of the destination device is located at a fourth offset that is larger than the third offset; and in response to a determination that a combination of the local identifiers for the source and destination devices matches a predefined zone rule, cause a delivery of the packet to the destination device.

16. The non-transitory machine-readable medium of claim 15, wherein:

the local identifiers of the source and destination devices are included in a header portion of the packet; and the global identifiers of the source and destination devices are included in a data payload portion of the packet.

17. The non-transitory machine-readable medium of claim 15, including instructions that upon execution cause the controller to:

determine whether the packet includes a connect command to establish a connection between the source device and the destination device; and read the local identifiers for the source and destination devices in response to a determination that the packet includes the connect command to establish the connection between the source device and the destination device.

18. The non-transitory machine-readable medium of claim 15, wherein the local identifier of the source device is generated by applying at least one hash function to the global identifier of the source device, and wherein the local identifier of the source device is a smaller data string than the global identifier of the source device.

19. The non-transitory machine-readable medium of claim 15, wherein:

the local identifiers of the source and destination devices are configured to be unique within the storage network; and the global identifiers of the source and destination devices are configured to be unique across multiple storage networks.

20. The non-transitory machine-readable medium of claim 15, wherein the second offset is variable across a plurality of packets, and wherein the first offset is constant across the plurality of packets.

\* \* \* \* \*